2,913,366
Patented Nov. 17, 1959

2,913,366

METHODS OF KILLING INSECTS AND FUNGI WITH PERCHLORYL FLUORIDE

Max T. Goebel, Chadds Ford, Pa., assignor to E. I. du Pont de Nemours and Company, Wilmington, Del., a corporation of Delaware No Drawing. Application October 28, 1957
Serial No. 692,561

6 Claims. (Cl. 167—17)

The present invention relates to fumigation and is particularly concerned with an improved method for fumigating, employing as the active agent perchloryl fluoride.

Perchloryl fluoride is commercially available and is currently sold by Pennsalt Chemical Corporation. It is a remarkably stable gas liquefying at −46.8° C. It is a colorless, noncorrosive, sweet-smelling gas, thermally stable to above 500° C. and is exceptionally shock stable making the product easy to ship and store. Hydrolysis is very slow at temperatures up to 250° C. It can be conveniently dispensed from cylinders.

While the compound is not particularly toxic to mammals in low concentrations, it has now been unexpectedly discovered that it is exceptionally toxic to insect pests even at very low concentrations. The compound is also toxic to such pests as bacteria and fungi in low concentrations. It penetrates porous and granular materials to substantial depths in concentrations lethal to these pests. It leaves no disagreeable odor or flavor characteristics in materials treated.

The terms "insecticide" and "insect" are used herein in their broad common usage and include spiders, mites and like pests which are not in the strict biological sense classed as insects. Thus, the usage herein conforms to the definitions provided by Congress in Public Law 104, the "Federal Insecticide, Fungicide, and Rodenticide Act" of 1947, Section 2, subsection $h$, wherein the term "insect" is used to refer not only to those small invertebrate animals belonging mostly to the class Insecta, comprising six-legged, usually-winged forms, as beetles, bugs, bees, flies, and so forth, but also to other allied classes of arthropods whose members are wingless and usually have more than six legs, as spiders, mites, ticks, centipedes, wood lice, and the like.

To combat infestations of insects, and fungi using perchloryl fluoride as a fumigant it is necessary only to use conventional fumigation apparatus and methods. In general, the compound is allowed to permeate an enclosed space in concentrations great enough to produce a lethal or parasiticidal effect. The toxicity of the active agent is influenced by many variable factors, such as the density of material being treated, type of structure, type of packaging or sealing, amount and rate of leakage, presence of moisture, particular species of pest being treated and like factors.

Because the rate of application of perchloryl fluoride varies with so many factors it is not possible to indicate generally the rate of application suitable for all situations. Certain particular usage rates that are generally found effective can be indicated but it must be understood that the determining of the proper rate in any given instance is conventional procedure to those skilled in the art.

Thus, for example, the compound can be used for fumigating grain and its ground products. Good results are obtained especially on insects when the compound is employed in an amount corresponding to at least about 0.05 pound per 1000 cubic feet of space within which the grain or its ground product is enclosed.

When used for fumigating structural pests, especially insects, for example termites in wooden beams, the amount employed is somewhat larger. Good results are generally obtained when about 1.0 pound or more is used per 1000 cubic feet of space within which the structures are located. More of the compound is used in treating structural pests because the structures are usually harder to permeate than grain and its ground products.

When used for fumigating nursery stock, the compound can be used at rates of about one pound per 500 to 1000 cubic feet of air within which the product is sealed. It can also be used for fumigating soils and when used for this purpose can be applied at the rate of 20 or more pounds per acre.

Primarily because of variations both in the types of materials which can be fumigated and in the types of infestations encountered it is not practicable to give specific indications of the time necessary to effect satisfactory control of pests when they are in contact with the compound. The fumigation time is of course influenced by the time available for treatment. In most cases, the time generally necessary will be between about 15 minutes and five hours. In warehouse fumigation, however, times of 24 hours or even considerably longer may be advisable depending upon the degree of infestation and the time available for treating.

The influence of temperature upon the compound is minimal. Fumigation using perchloryl fluoride can be carried out in the entire temperature range over which insect and fungus life exists which is from about 0° C. to 70° C. The toxic level for pests will generally be somewhat higher at low temperatures because of decreased insect metabolism and other pest activity at these temperatures. The variations in dosage rates are generally very slight and can be easily determined by those of ordinary skill in the art.

Because the compound is a gas having density greater than air, it will usually be introduced into the upper regions of an enclosed space because gravity will cause it to settle gradually into lower regions.

In certain applications it may be desirable to combine the active agent of this invention with volatile solvents or supplementary toxicants. Examples of supplementary toxicants include carbon tetrachloride, 1,2-dichloroethane, 1,2-dichloropropane, 1,3-dichloropropane, trichloroethylene, tetrachloroethylene, tetrachloroethane, methyl bromide, 1,2-dibromoethane, trichlorobromoethane, chloropicrin, 2,2'-dichloroethyl ether, 1,1-dichloro-1-nitroethane, 1,1-dichloro - 1 - nitropropane, paradichlorobenzene, hydrogen cyanide, carbon disulfide, acrylonitrile, ammonia, carbon monoxide, carbon dioxide, ethylene oxide, sulfur dioxide, formaldehyde, nicotine, naphthalene, naphthyl chloride, naphthyl formate and ethyl formate.

When the above compounds are solids, fumigation is typically effected using smokers or vaporizers. Such apparatus are well known in the art and need no further description here.

The following examples illustrate the invention and are not to be interpreted as limitative.

Example 1

Perchloryl fluoride is used to fumigate an enclosure whose walls and surfaces are infested with adult granary weevils (*Sitophilus granarius* L.). In such fumigation operations, known amounts of the gas are introduced into the enclosure from a cylinder and the interior surfaces and atmosphere of the enclosure are exposed to these gas vapors.

When 1.0 pound of perchloryl fluoride are used per 1000 cubic feet, a kill of about 60% of the infesting weevils is observed at the end of 15 minutes. Observations made 16 hours after continuous exposure to the gas vapors revealed 100% kill of the weevils.

Using the same operational procedure as that described above using 1.0 pound of perchloryl fluoride per 1000 cubic feet for a period of approximately 16 hours substantially complete control of the following insect pests is obtained: confused flour beetle (*Tribolium confusum* du V.), Indian meal moth (*Plodia interpunctella* (Hbn.)), cadelle (*Tenebroides mauritanicus* (L.)), lesser grain borer (*Rhizopertha dominica* (F.)) rice weevil (*Sitophilus oryza* (L.)) granary weevil (*Sitophilus Granarius* (L.)).

*Example 2*

Perchloryl fluoride is used as the fumigant in a fumigation chamber of the type used in fumigating nursery stock as required by quarantine laws. The chamber is filled with 2- and 3-year old fruit trees including peach, apple, plum, cherry and pear almost ready for shipment in interstate commerce. The gas is introduced into the chamber at the rate of 1.0 pound per 1000 cubic feet of enclosure for a period of four hours. Careful examination of the fruit stock thereafter reveals substantially complete control of all scale insects present (Order—Homoptera; family—Coccidae; species—various).

*Example 3*

To control bedbugs (*Cimex lectularius* L.) present within a structure, the structure is first thoroughly sealed at all openings (doors, windows, etc.) and 2.0 pounds of perchloryl fluoride gas per 1000 cubic feet of space is introduced into the structure. Observations made about 24 hours after continuous exposure of the structure's interior to perchloryl fluoride reveal substantially complete kill of all the bedbugs present.

*Example 4*

Perchloryl fluoride is introduced into an air-tight bin containing wheat stored to a depth of about 10 feet. The gas is introduced from a cylinder at the top of the bin at the rate of 2.0 pounds per 1000 cubic feet of enclosure. The wheat is infested at various levels with adult granary weevils before treatment with the perchloryl fluoride. After 72 hours exposure a satisfactory kill of all the adult granary weevils is observed at all levels in the wheat.

Using the same procedure and a concentration of about 0.05 pound per 1000 cubic feet of enclosure satisfactory control of the weevils is obtained after 72 hours exposure to perchloryl fluoride.

*Example 5*

The compound is injected into soil heavily infested with fungus causing root-rot disease at the rate of 33 pounds per acre and the soil covered with a vapor seal (a tarpaulin). The fungus causing root-rot disease (*Rhizoctonia* sp.) is substantially completely controlled.

The claims are:

1. A method for controlling insects and fungi which includes the step of exposing plants and plant products infested with these organisms to a lethal concentration of perchloryl fluoride.

2. A method which comprises the step of fumigating grain and its milled products with perchloryl fluoride.

3. A method which comprises treating grain and its milled products to destroy insects and fungi with a composition made up of perchloryl fluoride.

4. A method which comprises treating nursery stock with perchloryl fluoride in an enclosed space at a dosage of at least 0.05 pound per 1000 cubic feet of said space to destroy insects and fungi.

5. The method of fumigating soil which employs perchloryl fluoride to destroy insects and fungi.

6. In a method of fumigating for controlling insects and fungi, the step of exposing these organisms to a lethal concentration of perchloryl fluoride.

References Cited in the file of this patent

UNITED STATES PATENTS 2,076,364     Cady     Apr. 6, 1937

OTHER REFERENCES

Wardle et al.: "Insect Control," 1923, pub. by Univ. of Manchester, Longmans, Green and Co., London, p. 197.